US008238661B2

United States Patent
Klimov et al.

(10) Patent No.: US 8,238,661 B2
(45) Date of Patent: Aug. 7, 2012

(54) DEVICE FOR CONTACTLESSLY CONTROLLING THE SURFACE PROFILE OF OBJECTS

(75) Inventors: Andrey Vladimirovich Klimov, Moscow (RU); Sergey Vladimirovich Suhovey, Moscow (RU); Artem Leonidovich Yukhin, Palo Alto, CA (US)

(73) Assignee: Bioscrypt, Inc., Sunnyvale, CA (US)

( * ) Notice: Subject to any disclaimer, the term of this patent is extended or adjusted under 35 U.S.C. 154(b) by 1180 days.

(21) Appl. No.: 11/573,550

(22) PCT Filed: Apr. 1, 2005
(Under 37 CFR 1.47)

(86) PCT No.: PCT/RU2005/000160
§ 371 (c)(1),
(2), (4) Date: Jan. 15, 2008

(87) PCT Pub. No.: WO2006/031143
PCT Pub. Date: Mar. 23, 2006

(65) Prior Publication Data
US 2008/0266409 A1 Oct. 30, 2008
US 2009/0179996 A2 Jul. 16, 2009

(30) Foreign Application Priority Data

Aug. 12, 2004 (WO) ................ PCT/RU2004/000315

(51) Int. Cl.
*G06K 9/00* (2006.01)
(52) U.S. Cl. ...... 382/181; 356/3.02; 356/3.03; 356/600; 356/601; 348/297; 348/222.1; 348/131; 348/135
(58) Field of Classification Search ................. 356/3.02, 356/3.03, 600, 601; 382/181; 348/77, 79, 348/297, 1, 222, 131, 135
See application file for complete search history.

(56) References Cited

U.S. PATENT DOCUMENTS
4,349,277 A 9/1982 Mundy et al.
(Continued)

FOREIGN PATENT DOCUMENTS
DE 3718151 12/1987
(Continued)

OTHER PUBLICATIONS
PCT International Search Report, PCT/RU2005/000160, Aug. 25, 2005, 1 page.
(Continued)

*Primary Examiner* — Frantz Jean
(74) *Attorney, Agent, or Firm* — Nixon Peabody LLP

(57) ABSTRACT

The invention relates to the devices for contactlessly measuring surface profiles and can be used for person identification in security systems. The inventive device for contactlessly controlling surface profile comprises a pulse illumination unit which is provided with a transparency and forms a transparency image on an object surface, and image recording unit and a computer. Said device also comprises a control unit which is connected to the image recording unit in the form of a TV camera with field interlacing, the pulse illumination unit and to the computer for synchronizing the illumination of the object surface by said pulse illumination unit with the TV camera field and for synchronizing the image processing by the computer with the TV interlacing. The transparency is embodied in the form of a line screen provided with an aperiodical different width band structure and a uniform transmission along each band, thereby making it possible to identify the sequence of the line screen images on the object surface.

4 Claims, 2 Drawing Sheets

U.S. PATENT DOCUMENTS

| | | | |
|---|---|---|---|
| 4,460,921 A | | 7/1984 | Henry et al. |
| 4,660,970 A | * | 4/1987 | Ferrano ............... 356/3.03 |
| 4,737,845 A | | 4/1988 | Susuki et al. |
| 4,838,696 A | * | 6/1989 | Pryor ................... 356/602 |
| 5,461,417 A | | 10/1995 | White et al. |
| 5,615,003 A | | 3/1997 | Hermary et al. |
| 5,640,962 A | * | 6/1997 | Jean et al. ............. 600/407 |
| 5,717,512 A | | 2/1998 | Chmielewski et al. |
| 5,982,912 A | | 11/1999 | Fukui et al. |
| 6,002,505 A | * | 12/1999 | Kraenert et al. ....... 359/196.1 |
| 6,056,404 A | | 5/2000 | Kawai et al. |
| 6,111,580 A | * | 8/2000 | Kazama et al. ........ 715/863 |
| 6,323,761 B1 | | 11/2001 | Son |
| 6,377,700 B1 | | 4/2002 | Mack et al. |
| 6,927,854 B2 | | 8/2005 | Hirabayashi et al. |
| 2001/0017604 A1 | * | 8/2001 | Jacobsen et al. ....... 345/27 |
| 2002/0006222 A1 | | 1/2002 | Inagaki et al. |
| 2003/0123713 A1 | * | 7/2003 | Geng ..................... 382/118 |
| 2004/0041912 A1 | * | 3/2004 | Zeng ..................... 348/207.1 |
| 2004/0218788 A1 | | 11/2004 | Geng |
| 2005/0111705 A1 | | 5/2005 | Waupotitsch et al. |
| 2005/0225662 A1 | | 10/2005 | Tsuda et al. |

FOREIGN PATENT DOCUMENTS

| | | |
|---|---|---|
| DE | 19749435 | 5/1999 |
| EP | 0076866 | 4/1983 |
| JP | 6044365 | 2/1994 |
| JP | 2003-030684 | 1/2003 |
| RU | 2184933 | 7/2002 |
| RU | 2185598 | 7/2002 |
| RU | 2251748 | 5/2005 |
| WO | 00/70303 | 11/2000 |
| WO | 2006/031147 | 3/2006 |

OTHER PUBLICATIONS

Tajima, J., et al., "3-D data acquisition by Rainbow Range Finder," Pattern Recognition, 1990. Proceedings 10$^{th}$ International Conference on Pattern Recognition, Jun. 16-21, 1990, pp. 309-313, vol. 1, No. 10.

Valente, Stephane, et al., "A visual analysis/synthesis feedback loop for accurate face tracking", Signal Processing: Image Communication, Elsevier Science Publishers, Amsterdam, NL. vol. 16, No. 6, Feb. 1, 2001, pp. 585-608.

Wust, C., et al., "Surface profile measurement using color fringe projection," Machine Vision and Applications, Jun. 1991, pp. 193-203, vol. 4, No. 3.

Koziol, Stephen R., USPTO Office Communication dated Apr. 29, 2009 in relation to U.S. Appl. No. 11/485,745 filed Jul. 12, 2006 (8 pages).

Kotov, a., International Search Report, International Application No. PCT/RU2005/000210, Aug. 25, 2005, 1 page.

PCT International Search Report and Written Opinion, PCT/US2006/033098, Oct. 23, 2007, 11 pages.

Supplementary European Search Report for Application No. EP 05735484.7, dated Apr. 17, 2012, 3 pages.

* cited by examiner

DEVICE FOR CONTACTLESSLY CONTROLLING THE SURFACE PROFILE OF OBJECTS

This application is the National Stage of International Application No. PCT/RU2005/000160, published in Russian under PCT Article 21(2), filed Apr. 1, 2005, which claims priority to International Application No. PCT/RU2004/00315, filed Aug. 12, 2004, both of which are incorporated by reference in their entirety.

FIELD OF ENGINEERING THE INVENTION RELATES TO

The invention relates to the devices for contactlessly measuring surface profiles and can be used for person identification in security systems.

STATE OF THE ART

A device for contactless control of the surface profile of objects is known, WO 00/70303 of 23 Nov. 2000, comprising of a pulse illumination unit provided with a pulse light source and a transparency, which forms a transparency image on an object surface, an image recording unit and a computer, wherein the operation of the pulse illumination unit is synchronized with the operation of the image recording unit.

The disadvantage of this device lies in its inability to contactlessly control surface profiles of moving objects, when it is required to minimize the shift of the transparency image, recorded in the image recording unit, with respect to the corresponding image of the object surface, and a "smear" of images recorded in the recording unit. Besides, this device does not allow controlling the object surface profiles, which randomly appear for a short time in the field of view of the image recording unit.

INVENTION DISCLOSURE

The invention is aimed at providing a contactless control of the surface profiles of moving objects, which randomly appear and disappear in the field of view of the device.

A technical result of utilization of this invention is a periodicity of controlling the surface profile of a moving object as well as increase in control rate and accuracy. This also enables a maximum frequency of controlling the surface profile of a moving object—the field sweep frequency of a TV camera.

Described technical result is achieved by means of a device for contactless control of the surface profile of objects comprising a pulse illumination unit provided with a pulse light source and a transparency, which forms a transparency image on an object surface; an image recording unit and a computer; and additionally comprising of a control unit, which is connected to the image recording unit realized in the form of a TV camera with field interlacing, to the pulse illumination unit and to the computer for synchronizing the illumination of the object surface by said pulse illumination unit with the TV camera field and for synchronizing the image processing by the computer with TV camera interlacing.

In this case, the transparency of the pulse illumination unit can be realized to enable computer to recognize positions of images of its elements on the object surface. This allows for computer compensation for the decline in band image quality due to field interlacing.

The transparency can be realized in the form of a line screen provided with an aperiodic different width band structure and a uniform transmission along each band, thereby making it possible to identify the line screen images on the object surface.

TV camera can be realized with provided capability of changing the field sweep frequency.

BEST EMBODIMENT

Figure 1:
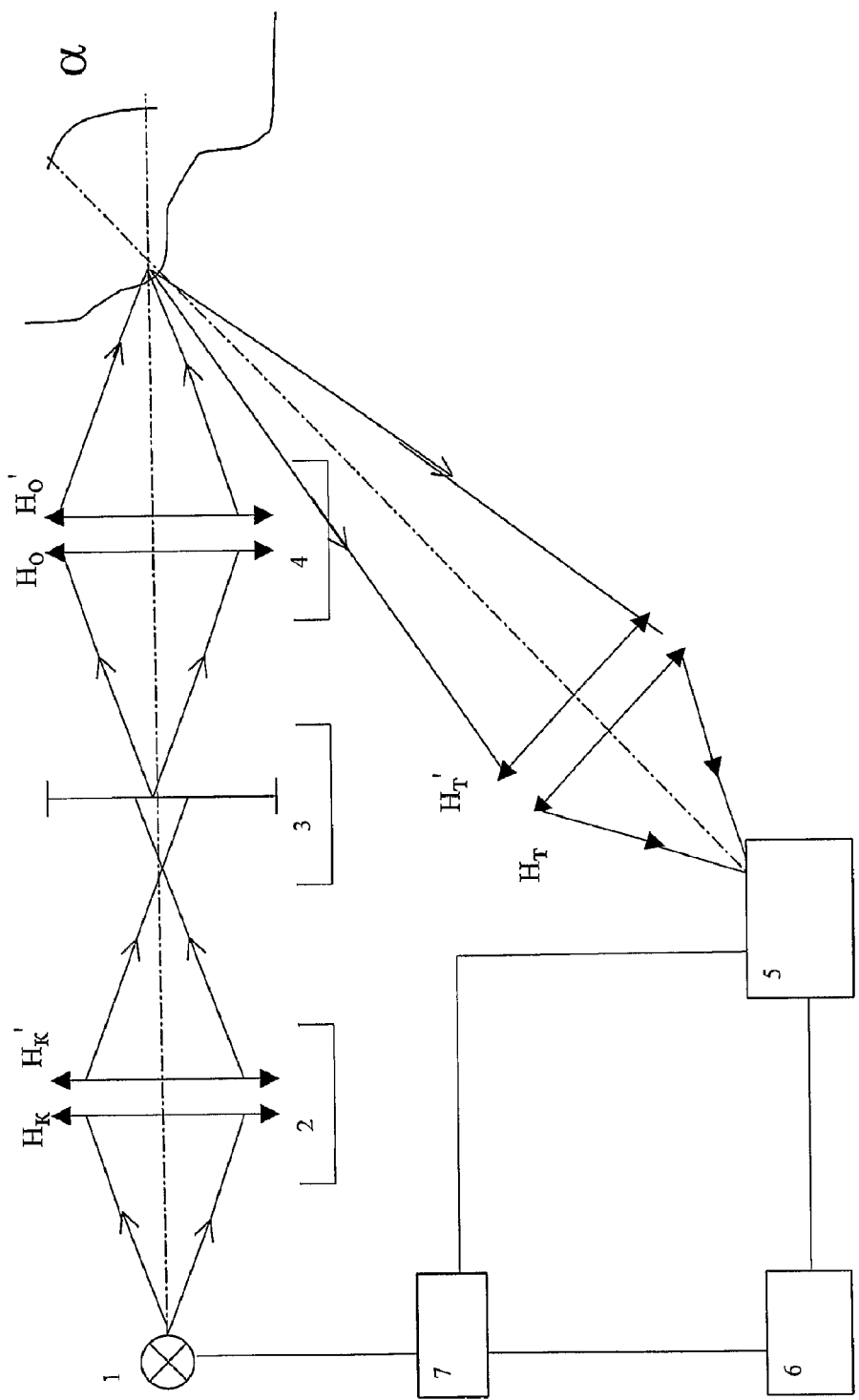
FIG. 1 shows a schematic of the device for contactless control of the surface profile of objects.

According to the schematic of the device for contactless control of the surface profile of objects shown in FIG. 1, this device comprises a pulse illumination block, which consists of a pulse light source 1, condenser 2, transparency 3 and projection lenses 4, TV camera 5, computer 6 and control unit 7. Control unit 7 is connected to the pulse light source 1, TV camera 5 and computer 6.

Figure 2:
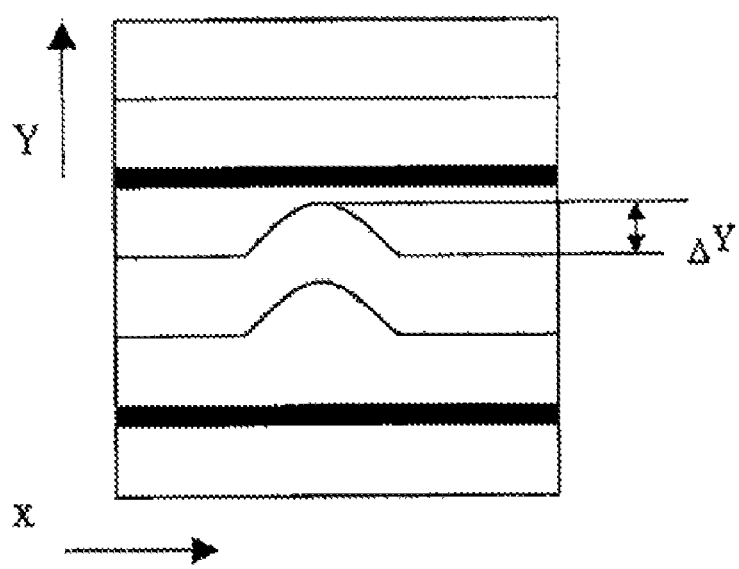
FIG. 2 shows transparency and its image distorted by the surface profile.

Optical axes of the projection lenses 4 and those of the TV camera 5 are positioned at an angle $\alpha$ with respect to each other. The image of the transparency 4 distorted by the surface profile of an object, for example, human face, is recorded by the TV camera and transmitted to the computer 6, which computes the height Z of the surface profile for a point with coordinates X,Y using the formula:

$$Z = \Delta Y / \tan(\alpha),$$

where $\Delta Y$ is a measure of image band distortion of the transparency 4 shown in FIG. 2.

TV camera 5 is chosen to have field interlacing, i.e. the first half of the field is recorded with an interval between lines, and the second—also with interval between the lines of the field sweep, but with a shift with respect to the lines of the first half of the field.

During the time of full field recording, the recording unit records the transparency image during the first half-field. To achieve this, the control unit 7 along with the pulse illumination unit and TV camera synchronizes the illumination pulse from the pulse light source 1 with the first half of the field. During the second half of the field, the surface image of an object illuminated with some additional light source (natural or artificial) is recorded. An essential moment is the use of TV camera with field interlacing in combination with pulse illumination unit to record the transparency image, which enables high processing rate.

The control unit 7 synchronizes the time of image processing by the computer 6 with the field sweep frequency of TV camera 5. The field sweep frequency is chosen based on anticipated movement rate of an object.

Realizing transparency 3 in the form of a linear pattern with aperiodic structure (not shown in FIG. 2) enables improved accuracy of determining the width of the band image, since relative variation of the bands in the transparency is known. Presence of variable width bands positioned aperiodically with respect to each other provides higher accuracy detection of their distortion orthogonally to the band direction over short period of time.

What is claimed is:
1. A device for contactlessly determining surface profile of moving objects comprising:
   a pulse illumination unit including a pulsed light source and a transparency, the pulse illumination unit project- ing an image of the transparency onto a surface of an object, the object surface distorting the image of the transparency;

an image recording unit that records the distorted image of the transparency, the image recording unit including a camera with field interlacing of a first half-field and a second half-field, the camera having a field sweep frequency associated with movement of the object surface;

a computer that processes a surface profile for the object according to the distorted image of the transparency recorded by the image recording unit; and a control unit, wherein the control unit synchronizes illumination pulses from the pulse illumination unit with the first half-field associated with the field interlacing of the camera while the image recording unit records the distorted image of the transparency, and the control unit synchronizes the image processing by the computer with the field sweep frequency of the camera.

2. A device according to claim 1, wherein the transparency provides a linear pattern including variable width bands positioned aperiodically with respect to each other.

3. A device according to claim 1, wherein the camera is provides variation in field sweep frequency.

4. The device of claim 1, wherein during the second half-field, the image recording unit records the object surface illuminated by another light source.

* * * * *